No. 820,986. PATENTED MAY 22, 1906.
J. A. PERKINS.
END THRUST BEARING.
APPLICATION FILED AUG. 14, 1903.
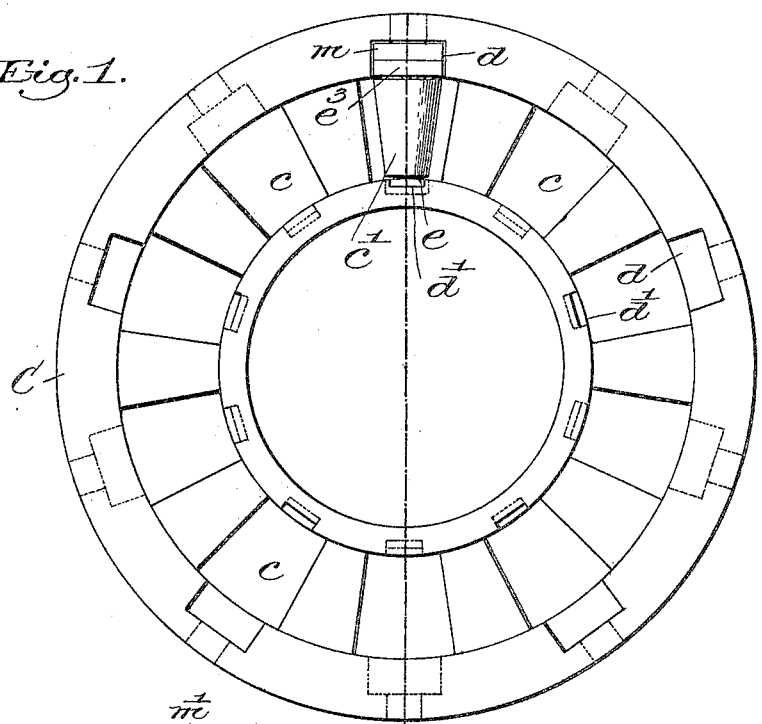
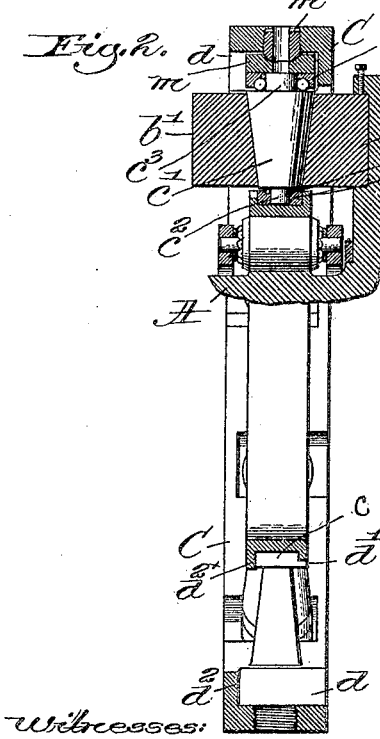
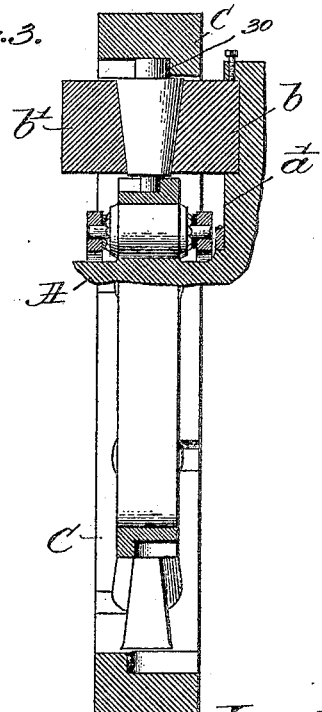

UNITED STATES PATENT OFFICE.

JULIUS A. PERKINS, OF OMAHA, NEBRASKA, ASSIGNOR TO MOFFETT BEARING COMPANY, OF COUNCIL BLUFFS, IOWA.

END-THRUST BEARING.

No. 820,986.      Specification of Letters Patent.      Patented May 22, 1906.

Application filed August 14, 1903. Serial No. 169,499.

*To all whom it may concern:*

Be it known that I, JULIUS A. PERKINS, a citizen of the United States, residing at Omaha, in the county of Douglas and State of Nebraska, have invented an Improvement in End-Thrust Bearings, of which the following description, in connection with the accompanying drawings, is a specification, like letters on the drawings representing like parts.

This invention has for its object to improve the construction of that class of bearing which is subjected to end thrust.

My invention relates more especially to a novel construction of end-thrust cage and the manner of retaining the conical end-thrust rollers in the cage, also in the combination of the cage and its rollers with tracks at both sides of the end-thrust cage.

Figure 1 in side elevation shows a cage containing the invention to be herein claimed with but one bearing-roller in position. Fig. 2 is a section in the line $x$, Fig. 1, of the cage, one conical end-thrust roller being shown in position, together with the tracks over which the rollers travel. Fig. 3 is a view similar to Fig. 2, showing a modification.

The shaft A (partially shown in Fig. 2) is represented as provided with a collar $a'$, at one side of which is fixed a track $b$, the shaft being surrounded with a complemental track $b'$, sustained as provided for in United States Patent No. 673,220 or in any usual suitable manner.

The end-thrust cage C, made as a ring tapered in cross-section, has a series of through-and-through openings $c$, in which are located the bodies of a series of conical end-thrust rollers $c'$, having journals $c^2$ $c^3$ at their opposite ends. The taper of the conical rollers corresponds with the bevel of the faces of the tracks $b$ $b'$, and as a result thereof the conical rollers may travel in a circular path on the tracks as the cage rotates about the shaft.

Above and below each through-and-through opening of the cage in which the conical rollers are located are ways $d$ $d'$, said ways leading into alternate spaces $c$ from opposite sides of the cage—as, for instance, in Fig. 2 the journals of the conical roller (shown as mounted therein) enter ways at the left-hand side of the cage, whereas the journals of the rollers next each side of said conical roller enter (see also the lower part of Fig. 2) ways made in the right-hand side of the cage. These ways extend but part way through the cage, leaving abutments $d^2$ $d^{2\times}$ at the inner end of each way.

The inner way $d'$ may receive a ball-track $e$, containing a series of balls $e'$, that surrounds the journal $c^2$ of one of the conical rollers.

The way $d$ receives a larger ball-track $e^3$, containing balls that surround the journal $c^3$ of the conical roller.

From the foregoing description it is apparent that the peripheries of the conical rollers are exposed and project from the through-and-through openings at each side of the cage and that the ball-tracks enter the cages alternately at opposite sides.

It is essential, as stated in my application, Serial No. 168,261, filed on the 5th day of August, 1903, that the external ball-tracks of the cage, if used, have their faces parallel with the shoulders of the conical rollers $c'$ from which the outermost journals extend. Herein each ball-track $e^3$ has resting against its outer end a washer $m$, provided with a conical seat that is entered by the conical point of a hollow screw $m'$, the screw enabling the washer to adapt itself to the position of the ball-track, as required by the balls and shoulder of the roller. The thickness of the washer is such that when removed the ball-track may thereafter be raised and taken, if desired, from the journal of the roller that the roller may be inspected. This invention as it applies to the cage is not, however, limited to the employment of the ball-tracks, as the journals may fit ways cut into the cage from opposite sides, as represented in Fig. 3, and provided with removable bearings 30 for the journals. In this modification the cage will preferably be made of brass or a metal different from that of the conical rollers and their journals, and the bearings 30 may be of hard fiber or Babbitt metal.

In the patent referred to the end-thrust rollers are inserted in position in the cage through openings at the periphery of the cage; but herein it will be understood that the journals of the conical end-thrust rollers enter first one and then the other side of the cage by a lateral movement, thus leaving the periphery of the cage unbroken except for the small screw-holes, the inner edge of the cage being unbroken, so that it may travel over and be maintained in working position by cylindrical bearing-rollers. The cage shown is very strong and sustains within its inner and outer edges either the ball-tracks and balls that guide both journals of the said rollers or the journals themselves, and said rollers are wholly sustained by the cage and will remain in the cage if the latter be removed from its position of work. The journals of the rollers do not contact with the box. The provision herein described for entering the conical rollers by a lateral motion thereof into opposite sides of the cage enables the large or outer ends of the rollers to be readily inspected, and, further, by inserting the rollers into the cage from alternate sides it is possible to decrease the longitudinal width of the cage and correspondingly decrease its weight, and therefore its inertia.

Having described my invention, what I claim, and desire to secure by Letters Patent, is—

1. A series of conical rollers, combined with an end-thrust cage having roller-spaces separated one from the other, said cage having at its opposite sides lateral ways intersecting the ends of alternate roller-spaces, said ways being adapted to receive alternately from opposite sides of the cage the journals of said rollers and maintain said rollers in said cage in a position radially to the shaft surrounded by said cage.

2. An end-thrust cage, comprising a ring tapered in cross-section and provided with through-and-through openings, the cage having at its opposite sides lateral ways extending partially through the cage, and conical rollers having their journals entered into said ways from the opposite sides of the cage.

3. An end-thrust cage, comprising a ring tapered in cross-section and unbroken at its inner edge, said cage having through-and-through openings and at the ends of said openings ways opening alternately at opposite sides of the cage, combined with conical rollers having journals entering said ways.

4. The combination with a series of tapered rollers having end journals, of an end-thrust cage having roller-spaces separate one from the other, alternate roller-spaces having leading into them from opposite sides of the cage lateral ways for the insertion of the journals at both ends of said rollers, and tracks at each side said cage to retain said rollers in position in said cage, said cage being shaped to maintain said rollers therein radially to the shaft surrounded by said cage.

5. In a roller-bearing, circular taper-faced tracks, an end-thrust cage interposed between said tracks and having roller-spaces separate one from the other, alternate spaces having lateral ways leading thereinto from opposite sides of the cage combined with a series of tapering rollers having end journals, said rollers being located in the spaces of said cage and interposed between said tracks, the journals of the rollers entering the lateral ways.

6. In a roller-bearing, circular taper-faced tracks and an interposed end-thrust cage having roller-spaces separate one from the other, alternate spaces having their sides open for the insertion in the cage of end-thrust rollers, leaving the journals of alternate end-thrust rollers exposed only at the same side of the cage.

7. In a roller-bearing, two circular tracks, an interposed end-thrust cage having conical end-thrust rollers provided with journals at both ends keeping the end-thrust rollers with their longitudinal axes radial to the shaft surrounded by said cage, the journals of said rollers in contact with the ends of the lateral ways cut alternately in the opposite sides of said cage preventing movement of the cage in a direction longitudinal of said shaft.

8. A roller-bearing cage for sustaining end-thrust rollers, said cage having through-and-through openings parallel with the shaft surrounded by the cage to receive the bodies of the end-thrust rollers, the opposite sides of the cage having made therein alternately pockets through which may enter the journals at opposite ends of the rollers as said journals are put into their operative position in the cage.

9. Two circular beveled tracks, an interposed end-thrust cage having through-and-through openings, and ways intersecting said through-and-through openings alternately from opposite sides of the cage, and a series of conical end-thrust rollers located in said through-and-through openings, the journals of said rollers entering alternately said ways from one and then from the opposite side of the cage.

10. In a roller-bearing, end-thrust rollers, an end-thrust cage having through-and-through openings to expose the sides of the rollers occupying radial positions in said cage, said cage having at its side a series of ways intersecting the ends of alternate through-and-through openings, said ways receiving the ends of the journals of the end-thrust rollers.

11. An end-thrust cage having through-and-through openings, provided at their opposite ends with lateral ways and conical rollers having journals at each end, combined with ball-tracks inserted laterally into said ways and balls in said ball-tracks surrounding said journals, and a series of hollow screws and washers, the washers being of a thickness when removed to enable the ball-tracks for the journals to be lifted to permit said journals and the shoulders of the rollers to be inspected.

In testimony whereof I have signed my name to this specification in the presence of two subscribing witnesses.

JULIUS A. PERKINS.

Witnesses:
GEO. W. GREGORY,
EDITH M. STODDARD.